(12) United States Patent
Kariya et al.

(10) Patent No.: US 12,543,732 B2
(45) Date of Patent: Feb. 10, 2026

(54) POWDERY PLANT ACTIVATOR

(71) Applicant: IBIDEN CO., LTD., Ogaki (JP)

(72) Inventors: Satoru Kariya, Ogaki (JP); Katsuhide Mizuno, Ogaki (JP); Nobuyoshi Ishino, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 273 days.

(21) Appl. No.: 18/566,190

(22) PCT Filed: Jun. 1, 2022

(86) PCT No.: PCT/JP2022/022385
§ 371 (c)(1),
(2) Date: Dec. 1, 2023

(87) PCT Pub. No.: WO2022/255419
PCT Pub. Date: Dec. 8, 2022

(65) Prior Publication Data
US 2024/0251791 A1    Aug. 1, 2024

(30) Foreign Application Priority Data

Jun. 2, 2021   (JP) ................. 2021-093099

(51) Int. Cl.
| | | |
|---|---|---|
| *A01N 37/06* | (2006.01) | |
| *A01C 21/00* | (2006.01) | |
| *A01N 25/12* | (2006.01) | |
| *A01N 37/36* | (2006.01) | |
| *A01N 37/42* | (2006.01) | |
| *A01P 21/00* | (2006.01) | |

(52) U.S. Cl.
CPC ............. *A01N 37/06* (2013.01); *A01N 25/12* (2013.01); *A01N 37/36* (2013.01); *A01N 37/42* (2013.01); *A01P 21/00* (2021.08); *A01C 21/00* (2013.01)

(58) Field of Classification Search
CPC ........ A01N 37/06; A01N 25/12; A01N 37/36; A01N 37/42; A01P 21/00; A01C 21/00
See application file for complete search history.

(56) References Cited

U.S. PATENT DOCUMENTS

| | | |
|---|---|---|
| 4,758,598 A | 7/1988 | Gregory |
| 6,987,130 B1 | 1/2006 | Yokoyama et al. |
| (Continued) | | |

FOREIGN PATENT DOCUMENTS

| | | |
|---|---|---|
| CN | 1152739 C | 6/2004 |
| JP | 58-113123 A | 7/1983 |
| (Continued) | | |

OTHER PUBLICATIONS

International Search Report mailed on Aug. 23, 2022 in PCT/JP2022/022385 filed on Jun. 1, 2022 3 pages).

(Continued)

*Primary Examiner* — Trevor Love
(74) *Attorney, Agent, or Firm* — Oblon, McClelland, Maier & Neustadt, L.L.P.

(57) ABSTRACT

The objective of the invention is to provide a plant activator having a resistance to the wash-off and a superior handleability, transportability and storage stability. A powdery plant activator comprising, at least one compound selected from an oxo fatty acid or a derivative or a salt thereof and a hydroxy fatty acid or a derivative or a salt thereof, and an unsaturated fatty acid (excluding an oxo fatty acid and a hydroxy fatty acid).

23 Claims, 4 Drawing Sheets

(56) References Cited

U.S. PATENT DOCUMENTS

2009/0076309 A1     3/2009   Yokoyama et al.
2021/0282398 A1     9/2021   Ohno et al.

FOREIGN PATENT DOCUMENTS

| JP | 2000-50841 A | 2/2000 |
| JP | 2013-237668 A | 11/2013 |
| WO | WO 2018/168860 A1 | 9/2018 |

OTHER PUBLICATIONS

Cowley. T et al., "Local and systemic effects of oxylipins on powdery mildew infection in barley", Pest Management Science. 2005. vol. 61. No. 6. pp. 572-576.
Extended European Search Report issued May 9, 2025 in European Patent Application No. 22816164.2, 11 pages.
Imke, "New Fatty Acids, Oxylipins and Volatiles in Microalgae", Göttingen, 2007, 178 pages.
Bligh et al., "A Rapid Method of Total Lipid Extraction and Purification", Canadian Journal of Biochemistry and Physiology, vol. 37, No. 8, Aug. 1959, 7 pages.
International Preliminary Report on Patentability and Written Opinion issued Aug. 23, 2022 in International Application No. PCT/JP2022/002385, 7 pgs.

POWDERY PLANT ACTIVATOR

CROSS-REFERENCE TO RELATED APPLICATIONS

The present application is a 35 U.S.C. § 371 national stage patent application of International patent application PCT/JP2022/022385, filed on Jun. 1, 2022, which is based on and claims the benefits of priority to Japanese Application No. 2021-093099, filed on Jun. 2, 2021. The entire contents of these applications are incorporated herein by reference.

TECHNICAL FIELD

The present invention relates to a powdery plant activator.

BACKGROUND ART

For the purpose of improving the supply efficiency of cereal plants and horticultural plants, among others, technologies for regulating plant growth have been developed. In addition to some measures, such as an optimization of temperature conditions or daylight conditions, or a fertilization, there have been some reports regarding a method for activating plants using a plant activator which has a plant growth regulating activity such as growth promotion, sleep suppression and stress resistance.

Patent Document 1 describes a plant activator comprising an oxo fatty acid derivative, or a salt or an ester thereof, as an active ingredient. Although the plant activator described in Patent Document 1 has a superior resistance-inducing effect and growth-promoting effect on plants, a use of this activator to induce a plant resistance and/or to promote a plant growth has a problem that the effect of the activator may not be sufficiently long lasting after being applied to plants.

The persistence of the effect of the activating component of plant activator is a problem also in terms of labor saving in, for example, agricultural work. It is assumed that the insufficient persistence of the effect of the plant activator described in Patent Document 1 is due to a possibility that the activator is washed away from the plant surface to which the activator has been applied and does not remain on the plant body at a sufficient concentration. However, there is no effective way to make the activator remain on the plant, and thus there has been a strong demand for a technology to obtain a satisfactory performance in terms of the persistence of the effect of the activating component.

PRIOR ART DOCUMENT

Patent Document

Patent Document 1: WO 2018/168860

SUMMARY OF THE INVENTION

Problem to be Solved by the Invention

Therefore, an object of the present invention is to provide a plant activator with an improved persistence of its effect and a long-lasting residual effect on the plant to which the plant activator is applied, and having an excellent handleability, transportability and storage stability as well as a superior disease resistance-inducing effect and plant growth-promoting effect.

Means to Solve the Problem

The present invention relates to a powdery plant activator comprising, at least one compound selected from an oxo fatty acid or a derivative or a salt thereof and a hydroxy fatty acid or a derivative or a salt thereof, and an unsaturated fatty acid (excluding an oxo fatty acid and a hydroxy fatty acid).

It may be preferable for the powdery plant activator that the unsaturated fatty acid is an unsaturated fatty acid with 10 to 20 carbon atoms.

It may be preferable for the powdery plant activator that the unsaturated fatty acid is at least one compound selected from a group of mono- or poly unsaturated fatty acids containing oleic acid, linoleic acid, alpha-linolenic acid, gamma-linolenic acid, and arachidonic acid.

It may be preferable for the powdery plant activator that the unsaturated fatty acid is linoleic acid.

It may be preferable for the powdery plant activator that the oxo fatty acid or a derivative or a salt thereof is an oxo fatty acid of general formula (I), or a derivative or a salt thereof,

(wherein
  $R^1$ is a straight or branched, saturated or unsaturated hydrocarbon group with 6 to 12 carbon atoms, and
  $R^2$ is an alkyl group with 2 to 8 carbon atoms, and optionally comprises one or more branches and/or double bonds).

It may be preferable for the powdery plant activator that the hydrocarbon group $R^1$ of the oxo fatty acid is a hydrocarbon group with 8 to 10 carbon atoms, and the alkyl group $R^2$ of the oxo fatty acid is an alkyl group with 4 to 6 carbon atoms.

It may be preferable for the powdery plant activator that $R^1$ of the oxo fatty acid comprises a double bond, the double bond forming a conjugated double bond with a double bond between an alpha carbon relative to a carbonyl group in general formula (I) and a beta carbon relative to the carbonyl group in general formula (I).

It may be preferable for the powdery plant activator that $R^1$ of the oxo fatty acid is a straight or branched hydrocarbon group with 9 carbon atoms, and $R^2$ of the oxo fatty acid is an alkyl group with 5 carbon atoms.

It may be preferable for the powdery plant activator that the oxo fatty acid is a ketooctadecadienoic acid.

It may be preferable for the powdery plant activator that the oxo fatty acid is 13-oxo-9,11-octadecadienoic acid.

It may be preferable for the powdery plant activator that the hydroxy fatty acid or a derivative or a salt thereof is a hydroxy fatty acid of general formula (II), or a derivative or a salt thereof,

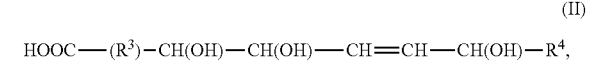

and/or
of general formula (III), or a derivative or a salt thereof,

(III)

(wherein
$R^3$ is a straight or branched hydrocarbon group with 4 to 12 carbon atoms, and optionally comprises one or more double bonds and/or OH groups, and the position of the double bond is not limited, provided that the double bond is comprised, and
$R^4$ is a straight or branched hydrocarbon group with 2 to 8 carbon atoms, and optionally comprises one or more double bonds and/or OH groups, and the position of the double bond is not limited, provided that the double bond is comprised).

It may be preferable for the powdery plant activator that the hydrocarbon group $R^3$ of the hydroxy fatty acid has 6 to 8 carbon atoms, and the hydrocarbon group $R^4$ of the hydroxy fatty acid has 4 to 6 carbon atoms.

It may be preferable for the powdery plant activator that $R^3$ of the hydroxy fatty acid is $-(CH_2)_n-$ (wherein n is an integer from 4 to 12), and $R^4$ of the hydroxy fatty acid derivative is $C_nH_{2n+1}-$ (wherein n is an integer from 2 to 8).

It may be preferable for the powdery plant activator that $R^3$ of the hydroxy fatty acid is an alkylene group $(-(CH_2)_7-)$ with 7 carbon atoms, and $R^4$ of the hydroxy fatty acid derivative is an alkyl group $(CH_3CH_2CH_2CH_2CH_2-)$ with 5 carbon atoms.

It may be preferable for the powdery plant activator that the hydroxy fatty acid is hydroxyoctadecenoic acid.

It may be preferable for the powdery plant activator that the hydroxy fatty acid is 9,10,13-trihydroxy-11-octadecenoic acid.

It may be preferable for the powdery plant activator that the hydroxy fatty acid derivative is 9,12,13-trihydroxy-10-octadecenoic acid.

The term "octadecenoic acid" is a conventional notation (for example, see JP H3-14539 A), and "9,10,13-trihydroxy-11-octadecenoic acid" mentioned above can be also denoted as "9,10,13-trihydroxyoctadeca-11-enoic acid" or "9,10,13-trihydroxy-11-octadecenoic acid". Similarly, "9,12,13-trihydroxy-10-octadecenoic acid" mentioned above can be also denoted as "9,12,13-trihydroxyoctadeca-10-enoic acid" or "9,12,13-trihydroxy-10-octadecenoic acid". Incidentally, in Examples of the present invention, the trade name by manufacturer is also indicated in parentheses. The above description applies to all "octadecenoic acid" as used herein, in the claims, drawings, and abstract.

The structural formula of "9,10,13-trihydroxy-11-octadecenoic acid" is shown in the structural formula (1) below.

[chemical formula 1]

structural formula (1)

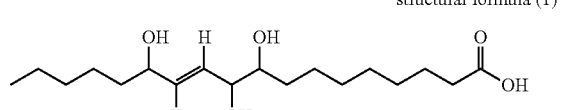

The structural formula of "9,12,13-trihydroxy-10-octadecenoic acid" is shown in structural formula (2) below.

[chemical formula 2]

structural formula (2)

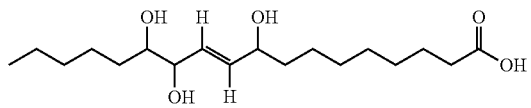

It may be preferable for the powdery plant activator that the powdery plant activator comprises the unsaturated fatty acid such that the ratio of the at least one compound selected from an oxo fatty acid or a derivative or a salt thereof and a hydroxy fatty acid or a derivative or a salt thereof relative to the unsaturated fatty acid is 10% to 90% by weight.

As a derivative of the oxo fatty acid or hydroxy fatty acid, it may be preferable that the derivative is an ester of oxo fatty acid or an ester of hydroxy fatty acid. Examples of salts of the oxo fatty acid or hydroxy fatty acid will be described below. For example, sodium salts, potassium salts, and ammonium salts may be used.

It may be preferable that the powdery plant activator is used as a spraying agent or an immersion agent for contacting with plant stems, leaves, or roots, or a soil injection agent.

It may be preferable that the powdery plant activator is applied to at least one plant selected from plants in family Brassicaceae, Poaceae, Fabaceae, Solanaceae, Rosaceae, Amaranthaceae, or Malvaceae.

The present invention relates to a method for manufacturing a powdery plant activator comprising at least one compound selected from an oxo fatty acid or a derivative or a salt thereof and a hydroxy fatty acid or a derivative or a salt thereof, and an unsaturated fatty acid (excluding an oxo fatty acid and a hydroxy fatty acid), wherein the method includes a freeze-drying step in order to obtain a powdered form.

Further, it may be preferable for the method for manufacturing the powdery plant activator that the method comprises dispersing the at least one compound selected from an oxo fatty acid or a derivative or a salt thereof and a hydroxy fatty acid or a derivative or a salt thereof, and the unsaturated fatty acid (excluding an oxo fatty acid and a hydroxy fatty acid) in water in order to obtain a water dispersion, and subjecting the water dispersion to the freeze-drying step by freezing the water dispersion and reducing a pressure in order to obtain the powdered form.

Further, it may be preferable that the water dispersion comprises a stabilizing agent.

Further, it may be preferable that the stabilizing agent is an emulsifier.

Further, it may be preferable that the emulsifier is at least one or more compounds selected from potassium carbonate or dipotassium hydrogen phosphate.

The powdery plant activator comprising at least one compound selected from an oxo fatty acid or a derivative or a salt thereof and a hydroxy fatty acid or a derivative or a salt thereof, and an unsaturated fatty acid (excluding an oxo fatty acid and a hydroxy fatty acid) may be in a block form in that powders agglomerate with each other to form a block shape. The reason to make the powdery plant activator into a block shape is that, as described below, the powdery plant activator can have a good transportability compared with the plant activator in a liquid form.

The present invention relates to a plant activator product comprising a block-shaped plant activator, wherein the block-shaped plant activator comprising at least one compound selected from an oxo fatty acid or a derivative or a salt thereof and a hydroxy fatty acid or a derivative or a salt thereof is contained in a cup-shaped hollow in a tray having multiple cup-shaped hollows. The form of the block-shaped plant activator product contained in the cup-shaped hollow in the tray may be preferred since it can provide an improved handleability and transportability of the plant activator.

In the context of the present invention, the block-shaped plant activator refers to a solid mass of powdery plant activator comprising at least one compound selected from an oxo fatty acid or a derivative or a salt thereof and a hydroxy fatty acid or a derivative or a salt thereof, in which powders of the powdery plant activator agglomerate with each other. The shape of block-shaped plant activator is not particularly limited and may be spherical (for example, true-spherical, substantially true-spherical, ellipsoidal), cubic, polyhedral (for example, cubic, rectangular parallelepiped-shaped), rod-shaped (for example, cylindrical, prismatic), flat plate-shaped or polygonal plate-shaped. Alternatively, the block-shaped plant activator may have a design on its surface (for example, design having a three-dimensional shape resembling a flower petal or corolla). Also, the block-shaped plant activator may contain a coloring agent.

It may be preferable that the block-shaped plant activator comprises an unsaturated fatty acid (excluding an oxo fatty acid and a hydroxy fatty acid).

Effects of the Invention

The powdery plant activator of the present invention has a superior resistance-inducing effect and growth-promoting effect on plants, and provides an improved persistence of its effect due to the effective prevention of the wash-off from the plant body as well as an excellent storage stability. Further, the powder form of the plant activator of the present invention also provides an excellent handleability and transportability.

EMBODIMENT FOR CARRYING OUT THE INVENTION

Plant Activator

Figure 1:
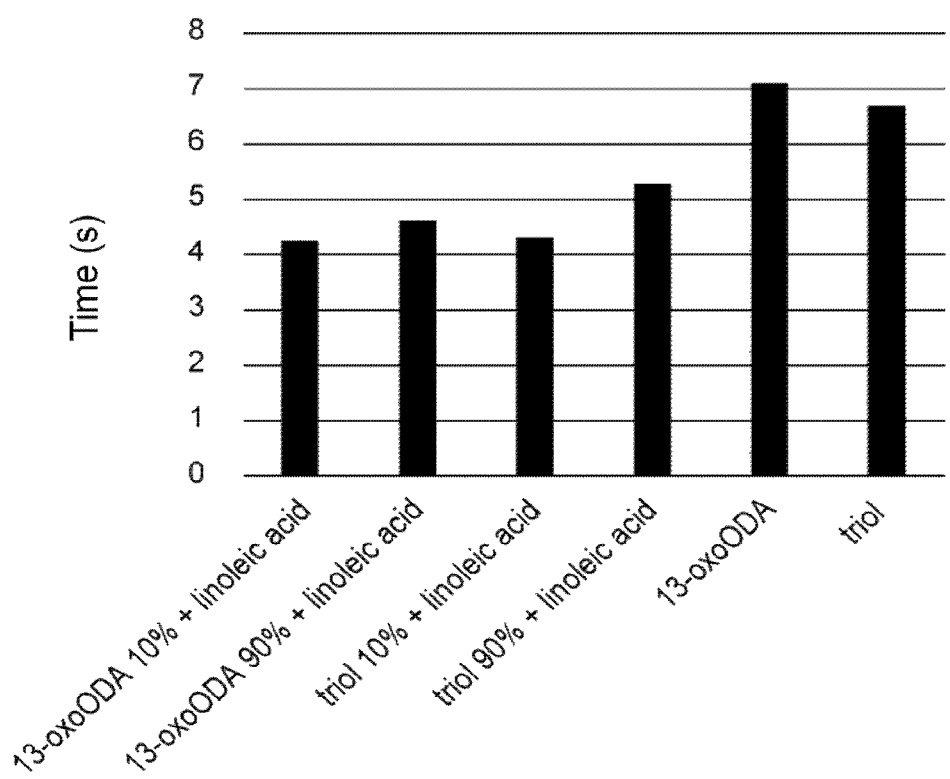
FIG. 1 is a graph showing the coexistence effect of the unsaturated fatty acid on resistance to wash-off.
Figure 2:
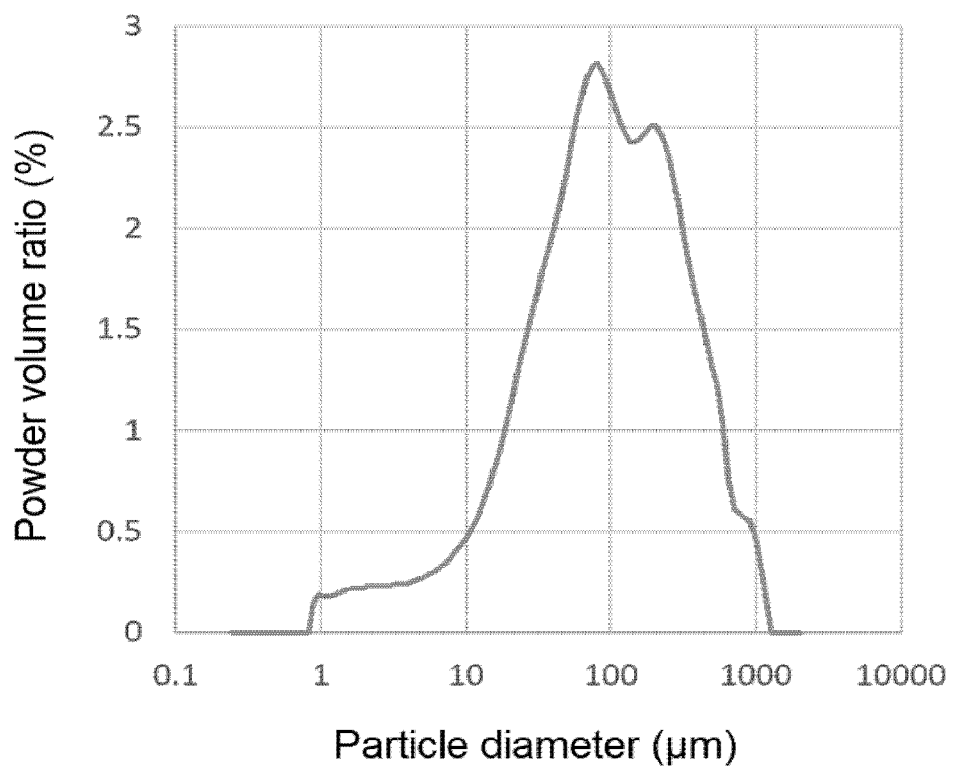
FIG. 2 is a graph showing the particle size distribution of the powdery plant activator for test in Example 1.
Figure 3:
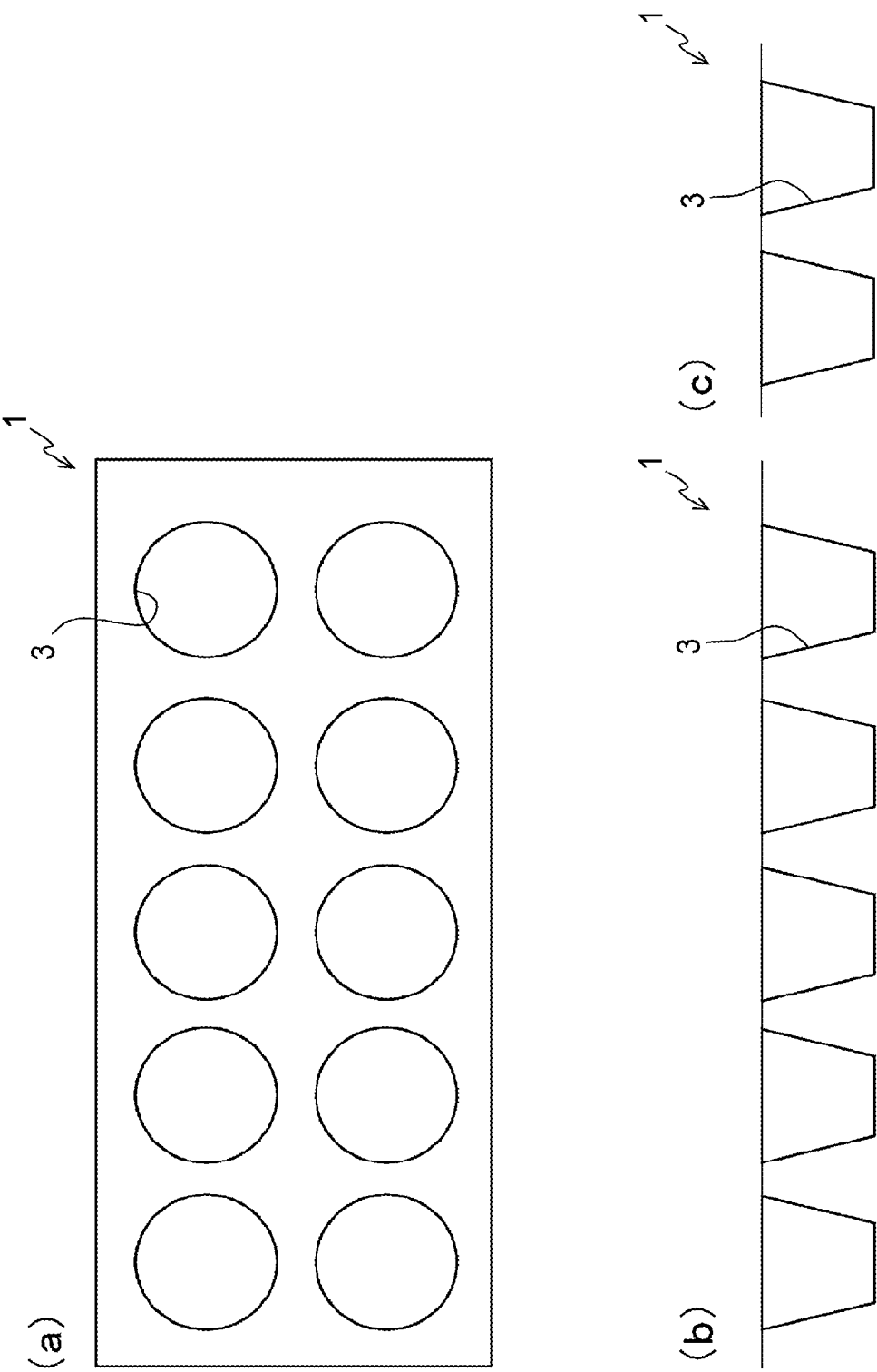
FIG. 3 is a graph showing the tray for the plant activator product; (a) a plan view, (b) a front view, and (c) a right side view.

A plant activator of the present invention is characterized in that it includes at least one compound selected from an oxo fatty acid or a derivative or a salt thereof and a hydroxy fatty acid or a derivative or a salt thereof, and an unsaturated fatty acid (excluding an oxo fatty acid and a hydroxy fatty acid), and is in a powder form.

Throughout the specification and the corresponding claims "plant activation" refers to adjusting the plant growth activity to being activated or maintained in some way, and is related to the concept that encompasses plant growth regulating actions including a growth promotion (which refers to the concept that includes an enlargement of leaves or stems, and a growth promotion of tubers or tuberous roots), sleep suppression, inducing and imparting a stress (for example, diseases) resistance, and anti-aging.

The powdery plant activator of the present invention includes, as an active ingredient, at least one compound selected from an oxo fatty acid or a derivative or a salt thereof and a hydroxy fatty acid or a derivative or a salt thereof, and an unsaturated fatty acid. By including at least one compound selected from such compounds or derivatives or salts thereof, the powdery plant activator of the present invention can render a growth-promoting effect on plants by being applied to a part of plant leaves, stems, or roots. The powdery plant activator of the present invention may provide a growth-promoting effect on the plants, given that when compared to untreated plants, an increase in leaf length and leaf weight, which is considered as one of the plant growth indicators, and a growth promotion of tubers or tuberous roots can be seen in plant body which is inoculated with the powdery plant activator of the present invention. Using the powdery plant activator of the present invention may promote the growth of plant bodies and result in an increase in yield of plant bodies such as vegetables, grains, and fruits. The plant growth-promoting effect of the powdery plant activator of the present invention is significantly high, and thus, resulting in an excellent yield increasing effect and improved harvesting efficiency of commercial crops. Further, the powdery plant activator of the present invention can activate a salicylic acid mediated signaling pathway which is related to the resistance induction in the plant body, resulting in the induction of resistance to, for example, disease in plant by being applied to a part of plant leaves, stems, or roots.

Although, as described above, the plant activator including an oxo fatty acid derivative or a salt or an ester thereof, as an active ingredient, has an excellent plant-activating effect, the active ingredient may be washed off by, for example, rain from the place on which the plant activator acts before or during the time when the active ingredient can produce sufficient effects. For many applications involving topical inoculation of the plant activator, such a wash-off of the active ingredient of the plant activator due to rain, wind erosion, and other erosive forces may significantly reduce the efficacy and duration of action of the plant activator.

The powdery plant activator of the present invention further includes an unsaturated fatty acid in addition to the above-described active ingredient, namely at least one compound selected from an oxo fatty acid or a derivative or a salt thereof and a hydroxy fatty acid or a derivative or a salt thereof. Incidentally, the unsaturated fatty acid of the present invention does not include an oxo fatty acid and a hydroxy fatty acid. The unsaturated fatty acid included in the powdery plant activator of the present invention is hydrophobic and has a low water solubility. As a result, the unsaturated fatty acid of the present invention can impart to the powdery plant activator a water repelling property at the inoculation site. In other words, the powdery plant activator of the present invention is unlikely to be washed off. Furthermore, the active ingredient, an oxo fatty acid or a derivative or a salt thereof and/or a hydroxy fatty acid or a derivative or a salt thereof, is present in the powdery plant activator such that the active ingredient is encompassed with the coexistent unsaturated fatty acid. Therefore, the powdery plant activator of the present invention shows remarkable resistance to the wash-off by, for example, rain and the active ingredient adheres more strongly to the surface of plant body such as plant leaf, resulting in an increase in persistence of plant-activating effect of the plant activator. Furthermore, the powdery plant activator of the present invention can be easily handled and transported because of its powdered form, and can provide an excellent stability in long-term storage.

As an oxo fatty acid or a derivative or a salt thereof of the present invention, the oxo fatty acid of general formula (I), or a derivative or a salt thereof,

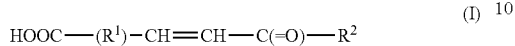
(I)

(wherein
$R^1$ is a straight or branched, saturated or unsaturated hydrocarbon group with 6 to 12 carbon atoms, and
$R^2$ is an alkyl group with 2 to 8 carbon atoms, and optionally comprises one or more branches and/or double bonds) may be suitably used.

In one embodiment of the present invention, the carbon number of the hydrocarbon group $R^1$ of the oxo fatty acid is 8 to 10, and the carbon number of the alkyl group $R^2$ of the oxo fatty acid is 4 to 6. In another embodiment of the present invention, $R^1$ of the oxo fatty acid includes a double bond, which forms a conjugated double bond with a double bond between an alpha carbon relative to a carbonyl group in general formula (I) and a beta carbon relative to the carbonyl group in general formula (I). Further, in another embodiment of the present invention, it is preferable that $R^1$ of the oxo fatty acid is a straight or branched hydrocarbon group with 9 carbon atoms, and $R^2$ of the oxo fatty acid is an alkyl group with 5 carbon atoms.

Exemplary examples of an oxo fatty acid of the present invention include ketooctadecadienoic acids. For example, exemplary examples of ketooctadecadienoic acids include, but not limited to, 9-oxo-10,12-octadecadienoic acid (9-oxoODA), 13-oxo-9,11-octadecadienoic acid (13-oxoODA), 5-oxo-6,8-octadecadienoic acid, 6-oxo-9,12-octadecadienoic acid, 8-oxo-9,12-octadecadienoic acid, 10-oxo-8,12-octadecadienoic acid, 11-oxo-9,12-octadecadienoic acid, 12-oxo-9,13-octadecadienoic acid and 14-oxo-9,12-octadecadienoic acid, and isomers thereof.

As a derivative of the oxo fatty acid, esters of the oxo fatty acid may be preferred. Exemplary examples of the esters of the oxo fatty acid include for instance, but not limited to, methyl ester, ethyl esters, propyl ester, butyl ester, pentyl ester, isopentyl ester and octyl ester. Exemplary examples of a salt of the oxo fatty acid include for instance, ammonium salt such as alkylammonium salt, for example, tetramethylammonium, alkaline earth metal salt such as calcium salt and magnesium salt, alkaline salt such as sodium salt, lithium salt and potassium salt, metal salt such as cobalt salt and manganese salt, however, examples are not limited to the salts described above as far as they are one or more agriculturally acceptable salts, such as, for example, salts capable to be used in fertilizers.

As a hydroxy fatty acid or a derivative or a salt thereof of the present invention, the hydroxy fatty acid of general formula (II), or a derivative or a salt thereof,

(II)

and/or
of general formula (III), or a derivative or a salt thereof,

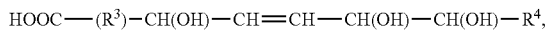
(III)

(wherein
$R^3$ is a straight or branched hydrocarbon group with 4 to 12 carbon atoms, and optionally comprises one or more double bonds and/or OH groups, and the position of the double bond is not limited, provided that the double bond is comprised, and
$R^4$ is a straight or branched hydrocarbon group with 2 to 8 carbon atoms, and optionally comprises one or more double bonds and/or OH groups, and the position of the double bond is not limited, provided that the double bond is comprised) may be suitably used.

In one embodiment of the present invention, the carbon number of the hydrocarbon group $R^3$ is 6 to 8, and the carbon number of the hydrocarbon group $R^4$ is 4 to 6. In another embodiment of the present invention, $R^3$ of the hydroxy fatty acid is $—(CH_2)_n—$ (wherein n is an integer from 4 to 12), and $R^4$ of the hydroxy fatty acid derivative is $C_nH_{2n+1}—$ (wherein n is an integer from 2 to 8). Further, in another embodiment of the present invention, it is preferable that $R^3$ of the hydroxy fatty acid is an alkylene group ($—(CH_2)_7—$) with 7 carbon atoms, and $R^4$ of the hydroxy fatty acid derivative is an alkyl group ($CH_3CH_2CH_2CH_2CH_2—$) with 5 carbon atoms.

Exemplary examples of a hydroxy fatty acid of the present invention include hydroxyoctadecenoic acid. Exemplary examples of hydroxyoctadecenoic acids include for instance, but not limited to, 9,10,13-trihydroxy-11-octadecenoic acid and/or 9,12,13-trihydroxy-10-octadecenoic acid, and isomers thereof.

As a derivative of the hydroxy fatty acid, esters of the hydroxy fatty acid may be preferred. Exemplary examples of the esters of the hydroxy fatty acid include for instance, but not limited to, methyl ester, ethyl esters, propyl ester, butyl ester, pentyl ester, isopentyl ester and octyl ester. Exemplary examples of a salt of the hydroxy fatty acid include for instance, ammonium salt such as alkylammonium salt, for example, tetramethylammonium, alkaline earth metal salt such as calcium salt and magnesium salt, alkaline salt such as sodium salt, lithium salt and potassium salt, metal salt such as cobalt salt and manganese salt, however, examples are not limited to the salts described above as far as they are one or more agriculturally acceptable salts, such as, for example, salts capable to be used in fertilizers.

Exemplary examples of the unsaturated fatty acid of the present invention may include, but not limited to, unsaturated fatty acids with 10 to 20 carbon atoms in view of, for example, a low solubility in water. For example, more preferably the unsaturated fatty acid of the present invention may be an unsaturated fatty acid with 18 carbon atoms. As for the unsaturated fatty acids of the present invention, the number of unsaturated bonds in their molecular structure is not limited, and they may be monounsaturated fatty acids or polyunsaturated fatty acids. For example, exemplary examples of the unsaturated fatty acids include, but not limited to, oleic acid, linoleic acid, oleic acid, α-linolenic acid, γ-linolenic acid and arachidonic acid. Also, the unsaturated fatty acids of the present invention can be free fatty acids or salts thereof (any salts capable to be used in general application, such as the salts exemplified above), and one or more kinds of unsaturated fatty acids may be selected. For the unsaturated fatty acids of the present invention, either commercially available compounds or compounds synthesized from commercial compounds may be used. Further, as the unsaturated fatty acid of the present invention, one kind of the unsaturated fatty acid may be used, or more than one kind of the unsaturated fatty acids may be used.

Incidentally, when the compounds exemplified herein have any isomers, all possible isomers can be used in the present invention, unless otherwise noted.

The powdery plant activator of the present invention includes at least one compound selected from at least one oxo fatty acid or derivative or salt thereof and at least one hydroxy fatty acid or derivative or salt thereof, and at least one unsaturated fatty acid. In other words, the unsaturated fatty acids that may be used in the present invention are not necessarily limited to the unsaturated fatty acid that can be selected based on its suitability for the specific oxo fatty acid or derivative or salt thereof or the specific hydroxy fatty acid or derivative or salt thereof. The wide range of unsaturated fatty acids may be used in the powdery plant activator of the present invention, together with an oxo fatty acid or derivative or salt thereof or a hydroxy fatty acid or derivative or salt thereof. For example, the powdery plant activator of the present invention may include at least one compound selected from at least one oxo fatty acid selected from 13-oxoODA and 9-oxoODA, or a derivative or salt thereof and at least one hydroxy fatty acid selected from 9,10,13-trihydroxy-11-octadecenoic acid and/or 9,12,13-trihydroxy-10-octadecenoic acid, or a derivative thereof or a salt thereof, and at least one unsaturated fatty acid selected from oleic acid, linoleic acid, α-linolenic acid, γ-linolenic acid and arachidonic acid. For example, the powdery plant activator of the present invention may include at least one compound selected from ketooctadecadienoic acid or a derivative or salt thereof and hydroxyoctadecenoic acid or a derivative or salt thereof, and at least one unsaturated fatty acid selected from oleic acid, linoleic acid, α-linolenic acid, γ-linolenic acid and arachidonic acid. For example, the powdery plant activator of the present invention may include 13-oxo-9,11-octadecadienoic acid or a derivative or salt thereof and linoleic acid, or, the powdery plant activator of the present invention may include 9,10,13-trihydroxy-11-octadecenoic acid and/or 9,12,13-trihydroxy-10-octadecenoic acid or a derivative or salt thereof and linoleic acid, or, the powdery plant activator of the present invention may include 13-oxo-9,11-octadecadienoic acid and/or 9,10,13-trihydroxy-11-octadecenoic acid and/or 9,12,13-trihydroxy-10-octadecenoic acid or a derivative or salt thereof and linoleic acid.

In the context of the present invention, when mixing at least one compound selected from at least one oxo fatty acid or a derivative or a salt thereof and at least one hydroxy fatty acid or a derivative or a salt thereof, and at least one unsaturated fatty acid, in order to blend those compounds evenly, it may be preferable to use a stabilizing agent (emulsifier) so that at least one compound selected from the at least one oxo fatty acid or a derivative or a salt thereof and the at least one hydroxy fatty acid or a derivative or a salt thereof, and the at least one unsaturated fatty acid can be stably present in water as an emulsion.

As a stabilizer (emulsifier) of the present invention, at least one or more kind of stabilizers selected from potassium carbonate and dipotassium hydrogen phosphate can be used.

The powdery plant activator of the present invention includes an unsaturated fatty acid, which minimizes the wash-off of the plant activator from the plant to which the powdery plant activator is applied. Furthermore, the coexistence of the unsaturated fatty acid in the powdery plant activator of the present invention does not result in a decrease or a loss of its excellent disease resistance-inducing effect and growth-promoting effect provided by the active ingredient that produces a plant-activating effect, namely, at least one compound selected from an oxo fatty acid or a derivative or a salt thereof and a hydroxy fatty acid or a derivative or a salt thereof. In addition, an unsaturated fatty acid has no adverse effect on the plant body to which the powdery plant activator is applied. As a result, the efficacy and persistence of the plant activator can be enhanced. Therefore, the powdery plant activator of the present invention can reduce the frequency of application of the plant activator to the plant body and also can reduce the amount of the plant activator itself to be applied.

As described above, the powdery plant activator of the present invention may be a powdery plant activator including at least one compound selected from a naturally occurring oxo fatty acid or derivative or salt thereof and a naturally occurring hydroxy fatty acid or a derivative or a salt thereof, and a naturally occurring unsaturated fatty acid. Therefore, the powdery plant activator of the present invention is also superior in terms of the low environmental load.

For the powdery plant activator of the present invention, it may be preferable that the unsaturated fatty acid and the active ingredient that produces a plant-activating effect, namely, at least one compound selected from an oxo fatty acid or a derivative or a salt thereof and a hydroxy fatty acid or a derivative or a salt thereof, are contained in the powdery plant activator in that, for example, the ratio of the at least one compound selected from an oxo fatty acid or a derivative or a salt thereof and a hydroxy fatty acid or a derivative or a salt thereof relative to the unsaturated fatty acid is about 90% or less by weight. When the ratio of the at least one compound selected from an oxo fatty acid or a derivative or a salt thereof and a hydroxy fatty acid or a derivative or a salt thereof relative to the unsaturated fatty acid is greater than 90%, the content of hydrophobic component in the powdery plant activator may become too low and the wash-off of the active ingredient may not be effectively prevented. It may be preferable that the unsaturated fatty acid and the active ingredient that produces a plant-activating effect, namely, at least one compound selected from an oxo fatty acid or a derivative or a salt thereof and a hydroxy fatty acid or a derivative or a salt thereof, are contained in the powdery plant activator in that, for example, the ratio of the at least one compound selected from an oxo fatty acid or a derivative or a salt thereof and a hydroxy fatty acid or a derivative or a salt thereof relative to the unsaturated fatty acid is about 10% or more by weight. When the ratio of the at least one compound selected from an oxo fatty acid or a derivative or a salt thereof and a hydroxy fatty acid or a derivative or a salt thereof relative to the unsaturated fatty acid is less than 10%, the content of active ingredient that produces a plant-activating effect in the powdery plant activator may become too low to provide sufficient plant-activating effect. For example, the ratio of the at least one compound selected from an oxo fatty acid or a derivative or a salt thereof and a hydroxy fatty acid or a derivative or a salt thereof relative to the unsaturated fatty acid in the powdery plant activator may be about 10% or more to about 90% or less by weight. Containing the active ingredient that produces a plant-activating effect and the unsaturated fatty acid in the powdery plant activator in such a ratio may provide a superior plant-activating effect and a superior resistance to the wash-off.

The powdery plant activator of the present invention is a dried product that can be prepared in a powder form by any conventional drying methods. Preferably, the drying can be performed, for example, by a lyophilization method. In other words, preferably, the powdery plant activator of the present invention may be a powdered form of a lyophilized product. The powdery plant activator of the present invention may be a ground or crushed form of a lyophilized product.

The lyophilization process for obtaining a powdery plant activator of the present invention may be performed using a commercially available freeze-drying equipment. The freeze-drying process is a low temperature treatment, and thus it can be performed without impairing the functionality of the active ingredient in the powdery plant activator of the present invention. The freeze-drying process of the present invention may include a vacuum freeze-drying treatment. In the vacuum freeze-drying treatment, the ice is allowed to sublimate directly to the water vapor under a vacuum without passing through the liquid phase. It may enable to well preserve the active ingredient in the powdery plant activator of the present invention. Furthermore, the freeze-drying process of the present invention may include a process for pre-freezing the composition containing the active ingredient into a frozen form prior to the vacuum freeze-drying treatment. As mentioned above, a powder preparing process, such as crushing or pulverization process of the lyophilized material, may optionally be performed after the freeze-drying process of the present invention.

For example, the lyophilization process may include a step for preparing a water dispersion by mixing at least one compound selected from at least one oxo fatty acid or a derivative or a salt thereof and at least one hydroxy fatty acid or a derivative or a salt thereof, and at least one unsaturated fatty acid with water as dispersing medium. When mixing, it may be preferable to emulsify the water dispersion by adding at least one or more kind of stabilizers (emulsifiers) selected from potassium carbonate and dipotassium hydrogen phosphate as described above.

Preferably the lyophilization of the water dispersion may be performed under the condition at a freezing temperature of −45° C. or lower and at a vacuum pressure of 600 Pa or lower. This condition may provide a lyophilized product with a reduced moisture content of about 5% or less, preferably about 3% or less. The resulting lyophilized product, or optionally a powder prepared lyophilized product, is in a powder form, and an average particle diameter (D50) of particles of the lyophilized product in the powder form is preferably about 100 μm or less. The average particle diameter of the particles can be measured, for example, by light scattering.

The term "powder" used herein for the powdery plant activator of the present invention may refer to solid particles, including the particles of granular shape, flake shape, pellet shape, granule shape. The powdery plant activator of the present invention may in a form in that the powders agglomerate with each other to form a solid mass (i.e., a block shape). Exemplary examples of shapes of the block include for instance, but not particularly limited to, spherical (for example, true-spherical, substantially true-spherical, ellipsoidal), cubic, polyhedral (for example, cubic, rectangular parallelepiped-shaped), rod-shaped (for example, cylindrical, prismatic), flat plate-shaped or polygonal plate-shaped. However, the shape and size of the block for the block-shaped plant activator can be modified properly.

For example, the block-shaped plant activator may have a design on its surface (for example, design having a three-dimensional shape resembling a flower petal or corolla), or may contain a coloring agent. For the method to agglomerate the powders of the powdery plant activator of the present invention with each other, any methods, including the conventional molding methods described below, can be adopted.

The powdery plant activator of the present invention may also be made into a shape suitable for use by, for example, using a specific container during lyophilization. For example, a tray for lyophilization, specifically the hollows of a tray having multiple hollows, may be filled with the water dispersion prepared as described above, and subjected to lyophilization to form a block-shaped plant activator which is housed in the tray. This may suppress an occurrence of defects such as chipping or cracking of the block-shaped plant activator during transportation. Forming the plant activator in a block form and having the block-shaped plant activator contained in the tray may provide a plant activator having an improved transportability and ease in use while maintaining the sufficient activity of the plant activator.

Exemplary examples of such trays include for instance, a tray made of cold-resistant resin that can withstand freeze-drying. Exemplary examples of the cold-resistant resin to be suitably used include for instance, but not particularly limited to, polypropylene. For example, trays with 1 to 50 hollows may be used, and, the entire tray may be sealed by bonding a film or the like to the tray surface after freeze-drying. This would enable to prevent the deterioration of plant activator due to moisture absorption of the plant activator contained in the tray. The block-shaped plant activator product may be opened in, for example, the farm field by peeling off the film from the desired number of the hollows that contain a block-shaped plant activator in each of them, and the block-shaped plant activator may be removed from the tray and then dispersed and/or dissolved in a predetermined amount of water to prepare a liquid form of plant activator that can be sprayed in, for example, the farm field. Thus, by the plant activator product of the present invention, a plant activator with a further improved handleability can be provided.

Figure 4:
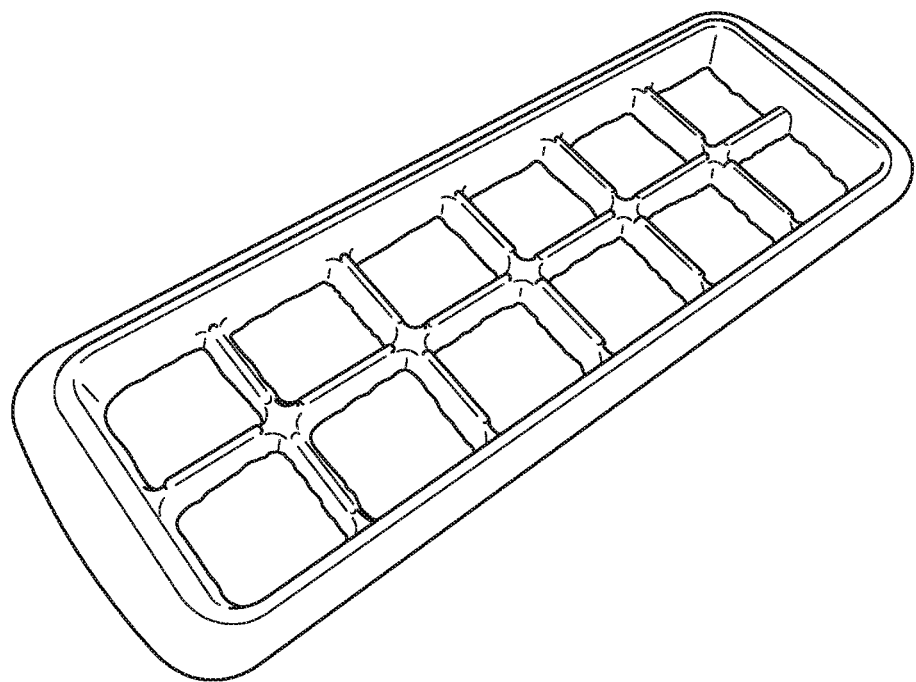
FIG. 4 is a graph showing the picture of the plant activator product manufactured using a commercially available plastic ice tray as a tray.

Exemplary examples of the tray that may be used for the plant activator product of the present invention include a commercially available resin-made ice tray as shown in the picture of FIG. 4. Using such commercially available ice trays may also make manufacturing the plant activator products simple.

The powdery plant activator of the present invention may contain excipients or carriers suitable for use as plant activators, if necessary. Examples of these additives are not particularly limited, as far as they are agriculturally acceptable agents. Other components which can be generally used for coloring agents or agrochemical formulations may be further contained in the powdery plant activator in addition to excipients and carriers. The powdery plant activator of the present invention may also contain other additives such as ionic or nonionic surfactants, emulsifiers, dispersants, anti-foaming agents, permeation enhancers, humectants, ionic or nonionic wetting agents, anti-freezing agents, preservatives, and antioxidants.

The powdery plant activator of the present invention may be in a form of molded article made of powder. For example, known methods such as press molding and extrusion molding may be used. The shape or size of the molded article is not particularly limited, and can be designed to suit the application and purpose of use. For example, the powdery plant activator may be in tablet form or may be molded to improve the design of the appearance. For example, the powdery plant activator may be molded into the form of blocks with a design such as different flower shapes. Alternatively, the bumps and dents to express a design such as a pattern representing, for example, the place of use may be formed on the surface.

The powdery plant activator of the present invention may be applied to the plant by any method. For example, the powdery plant activator of the present invention may be used as a hydrating agent which can be suspended in water when used, or as a spraying agent to make the plant activator contact with plant stems, leaves, or roots. Alternatively, the powdery plant activator of the present invention may be used as an immersion agent or as a soil injection agent. The specific method of application may be selected properly according to the plants to be cultivated to which the powdery plant activator is applied or the form of the powdery plant activator to be used, and exemplary examples of those method may include for instance ground spraying of liquid agent, ground spraying of solid agent, aerial spraying of liquid agent, aerial spraying of solid agent, liquid surface spraying, in-facility application, soil mixing application, soil irrigation application, surface treatment such as coating process, seedling box application, single flower treatment, and plant foot treatment. The powdery plant activator of the present invention provides a plant growth-promoting effect and stress (for example, diseases) resistance-inducing effect on plants to which the powdery plant activator is applied. Further, the powdery plant activator of the present invention may be particularly preferred in the application for treating plant stems and leaves among the applications described above since it has remarkable resistance to the wash-off.

The plants to which the powdery plant activator of the present invention can be applied are not particularly limited, and the powdery plant activator of the present invention may be applied to plants in general, and exemplary examples of plants include for instance, a plant in family Brassicaceae, Poaceae, Fabaceae, Solanaceae, Rosaceae, Amaranthaceae, or Malvaceae. The plant to be subjected for application may not be limited to a wild-type, and may be, for example, a mutant or transformant. The varieties of plant may not also be limited.

EXAMPLES

The present invention will be illustrated in detail by way of the Examples below, although the present invention shall be not limited to those specific Examples.

Example 1

As at least one compound selected from an oxo fatty acid or a derivative or a salt thereof and a hydroxy fatty acid or a derivative or a salt thereof, the ketooctadecadienoic acid, 13-oxo-9,11-octadecadienoic acid (13-oxoODA) ((9Z,11E)-13-oxo-9,11-octadecadienoic acid, Cayman Chemical Company, INC.) was used. As an unsaturated fatty acid, linoleic acid (primary linoleic acid from FUJIFILM Wako Chemicals) was used. To 1 g of linoleic acid, 0.1 g of 13-oxoODA and 1 g of potassium carbonate was added and mixed (the percentage of oxo fatty acid to linoleic acid=10%). The resulting mixture was dispersed in water to prepare 20 mL of aqueous solution (water dispersion). The prepared aqueous solution (water dispersion) was placed in a 30 mL brown bottle (with an inactivated inner surface) and frozen at −80° C. overnight. The frozen sample was freeze-dried using a vacuum freeze-dryer (vacuum inside the vacuum freeze-dryer: 15 Pa, trap temperature: −45° C., drying time: 40 hours). A powdery plant activator for test in Example 1 was obtained with a dry weight of 1.82 g.

Example 2

Similar to Example 1, 13-oxoODA was used as the oxo fatty acid, and linoleic acid was used as the unsaturated fatty acid. To 0.5 g of linoleic acid, 0.45 g of 13-oxoODA and 1 g of potassium carbonate was added and mixed (the percentage of oxo fatty acid to linoleic acid=90%). 20 mL of aqueous solution (water dispersion) was prepared using the resulting mixture according to the method similar to Example 1, followed by freeze-drying, and then a powdery plant activator for test in Example 2 was obtained.

Example 3

The hydroxyoctadecenoic acid, 9,10,13-trihydroxy-11-octadecenoic acid (Larodan Fine Chemicals AB, 9(S),10(S),13(S)-trihydroxy-11(E)-octadecenoic acid in English: 9(S),10(S),13(S)-trihydroxy-11(E)-octadecenoic acid in Japanese) and 9,12,13-trihydroxy-10-octadecenoic acid (Larodan Fine Chemicals AB, 9(S),12(S),13(S)-trihydroxy-10(E)-octadecenoic acid in English: 9(S),12(S),13(S)-trihydroxy-10(E)-octadecenoic acid in Japanese) were mixed in the ratio of 2:1, and the resulting mixture was used as at least one compound selected from an oxo fatty acid or a derivative or a salt thereof and a hydroxy fatty acid or a derivative or a salt thereof. To 1 g of linoleic acid (FUJIFILM Wako Chemicals, first grade linoleic acid) as an unsaturated fatty acid, 0.067 g of 9(S),10(S),13(S)-trihydroxy-11(E)-octadecenoic acid, 0.033 g of 9(S),12(S),13(S)-trihydroxy-10(E)-octadecenoic acid, and 1 g of potassium carbonate were mixed (the percentage of hydroxy fatty acid to linoleic acid=10%). 20 mL of aqueous solution (water dispersion) was prepared using the resulting mixture according to the method similar to Example 1, followed by freeze-drying, and then a powdery plant activator for test in Example 3 was obtained.

Example 4

Similar to Example 3, a mixture of two hydroxy fatty acids 9(S),10(S),13(S)-trihydroxy-11(E)-octadecenoic acid and 9(S),12(S),13(S)-trihydroxy-10(E)-octadecenoic acid, with the ratio of 2:1 was used as the hydroxy fatty acid, and linoleic acid was used as the unsaturated fatty acid. To 0.5 g of linoleic acid, 0.45 g of hydroxy fatty acids mixture and 1 g of potassium carbonate were mixed (the percentage of hydroxy fatty acid to linoleic acid=90%). 20 mL of aqueous solution (water dispersion) was prepared using the resulting mixture according to the method similar to Example 1, followed by freeze-drying, and then a powdery plant activator for test in Example 4 was obtained.

Comparative Example 1

20 mL of aqueous solution (water dispersion) was prepared using 0.1 g of 13-oxoODA of Example 1 and 1 g of potassium carbonate according to the method similar to Example 1, followed by freeze-drying, and then a powdery plant activator for test in Comparative Example 1, which do not contain linoleic acid, was obtained.

Comparative Example 2

0.067 g of 9(S),10(S),13(S)-trihydroxy-11(E)-octadecenoic acid, 0.033 g of 9(S),12(S),13(S)-trihydroxy-10(E)- octadecenoic acid, and 1 g of potassium carbonate were mixed, and then 20 mL of aqueous solution (water dispersion) was prepared using the resulting mixture according to the method similar to Example 1, followed by freeze-drying, and then a powdery plant activator for test in Comparative Example 2, which do not contain linoleic acid, was obtained.
<Evaluation Method>
The powdery plant activators for test prepared in the above-described Examples 1-4 and Comparative Examples 1 and 2 were tested and evaluated by the following methods.
<Water Repellency Test>
Water repellency tests were conducted on each of the powdery plant activators for test in Examples 1-4 and Comparative Examples 1 and 2 containing no unsaturated fatty acid. The water repellency test was performed using a sample prepared by dispersing 1 mg of each lyophilized powdery plant activator for test in 0.5 mL of water. The water to be used for the water repellency test was ion-exchanged water. For the water repellency test, a polypropylene resin plate was prepared, and then a spinach leaf with a length of about 15 cm was fixed on the resin plate. 5 µL of each powdery plant activator for test, which was dispersed in water, was applied and spread over the spinach leaf using a spatula with a width of 1 cm in the longitudinal direction and allowed to dry to form a surface for the evaluation of each powdery plant activator for test. The resin plate on which the spinach leaf was fixed was fixed to a holder such that the surface for the evaluation was inclined at an angle of 24 degrees with respect to the horizontal. Then, 50 µL of ion-exchanged water was dropped from a position 2.5 cm above each surface for the evaluation so as to pass through the surface for the evaluation along the length of the spinach leaf, and the time required for 50 µL of ion-exchanged water to flow down a zone of 11.5 cm, from the position on the spinach leaf to which the water was dropped and including the surface for the evaluation (1 cm), was measured. The results are shown in FIG. 1.

As shown in FIG. 1, water flowed down faster when the surface for the evaluation included the surface to which the powdery plant activator for test that contains unsaturated fatty acid (Examples 1-4) was applied. In other words, it was found that the surface to which the powdery plant activator for test containing unsaturated fatty acid was applied was highly water repellent.

Therefore, when an aqueous solution (water dispersion) of the powdery plant activator which contains the unsaturated fatty acid such that the ratio of the oxo fatty acid or a derivative or a salt thereof or the hydroxy fatty acid or a derivative or a salt thereof relative to the unsaturated fatty acid is 10% to 90% by weight is applied, the resistance of the powdery plant activator to be contacted with a fluid (water) is suppressed. As a result, the powdery plant activator applied to the plant body has a resistance to the wash-off by, for example, rain that may fall after the application of the powdery plant activator. Thus, the active ingredient of the powdery plant activator of the present invention hardly flows down, resulting in a longer adhesion period to the surface of plant body, such as plant leaves, which leads an increased persistence period of the plant-activating effect.
<Particle Size Distribution Measurement>
Particle size distribution measurement of the powdery plant activator for test in Example 1 were performed using a laser diffraction/scattering particle size distribution analyzer (Microtrac MT3300EX) with a measurement range of 0.1 to 10,000 μm and based on the volume standard for a particle size standard. In this context, the powdery plant activator for test was freeze-dried and coarsely ground, and then subjected to the particle size distribution measurement. The result for the particle size distribution measurement of the powdery plant activator of Example 1 is shown in FIG. 2. The particle size of the powdery plant activator of Example 1 was 88.66 μm at a value of D50.

<Preparation of a Block-Shaped Plant Activator>

6 mL of aqueous solution (water dispersion) prepared according to the method similar to Example 1 was poured into each hollow 3 of a tray 1 made of cold-resistant polypropylene having 10 cup-shaped (U-bottom) hollows 3 (10 mL/hollow) as shown in FIG. 3, and then the aqueous solution was frozen at −80° C. overnight. The frozen sample was freeze-dried using a vacuum freeze-dryer (vacuum inside the vacuum freeze-dryer: 15 Pa, trap temperature: −45° C., drying time: 40 hours). After freeze-drying, a polypropylene film (not shown) was placed on the top surface of tray 1 and bonded to the tray 1 by a thermocompression bonding at 150° C. Each of the hollows 3 was sealed by the polypropylene film. A block-shaped plant activator was obtained in the form of 10 blocks of plant activator housed in tray 1 made of polypropylene.

The above results demonstrate that the powdery plant activator of the present invention is an excellent plant activator that has a resistance to the wash-off and thus provides an excellent plant-activating effect with superior persistence as well as an improved handleability and transportability.

REFERENCE SIGN LIST

1 tray
3 hollow

The invention claimed is:

1. A powdery plant activator comprising, at least one compound selected from the group consisting of an oxo fatty acid or a derivative or a salt thereof and a hydroxy fatty acid or a derivative or a salt thereof; and an unsaturated fatty acid, wherein the unsaturated fatty acid is linoleic acid.

2. The powdery plant activator of claim 1, wherein the at least one compound is an oxo fatty acid or a derivative or a salt thereof, which is an oxo fatty acid of formula (I), or a derivative or a salt thereof:

$$\mathrm{HOOC{-}(R^1){-}CH{=}CH{-}C({=}O){-}R^2} \qquad \text{(I)}$$

wherein $R^1$ is a straight or branched, saturated or unsaturated hydrocarbon group having 6 to 12 carbon atoms, and $R^2$ is an alkyl group having 2 to 8 carbon atoms, and optionally comprises one or more branches and/or double bonds.

3. The powdery plant activator of claim 2, wherein the hydrocarbon group $R^1$ of the oxo fatty acid is a hydrocarbon group having 8 to 10 carbon atoms, and the alkyl group $R^2$ of the oxo fatty acid is an alkyl group having 4 to 6 carbon atoms.

4. The powdery plant activator of claim 3, wherein $R^1$ of the oxo fatty acid comprises a double bond, the double bond forming a conjugated double bond with a double bond between an alpha carbon relative to a carbonyl group in formula (I) and a beta carbon relative to the carbonyl group in formula (I).

5. The powdery plant activator of claim 4, wherein $R^1$ of the oxo fatty acid is a straight or branched hydrocarbon group having 9 carbon atoms, and $R^2$ of the oxo fatty acid is an alkyl group having 5 carbon atoms.

6. The powdery plant activator of claim 1, wherein the at least one compound is an oxo fatty acid, which is a ketooctadecadienoic acid.

7. The powdery plant activator of claim 6, wherein the oxo fatty acid is 13-oxo-9,11-octadecadienoic acid.

8. The powdery plant activator of claim 1, wherein the at least one compound is a hydroxy fatty acid or a derivative or a salt thereof, which is a hydroxy fatty acid of formula (II), or a derivative or a salt thereof,

(II)

and/or
of formula (III), or a derivative or a salt thereof,

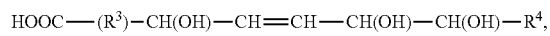
(III)

wherein
$R^3$ is a straight or branched hydrocarbon group having 4 to 12 carbon atoms, and optionally comprises one or more double bonds and/or OH groups, and the position of the double bond is not limited, provided that the double bond is comprised, and $R^4$ is a straight or branched hydrocarbon group having 2 to 8 carbon atoms, and optionally comprises one or more double bonds and/or OH groups, and the position of the double bond is not limited, provided that the double bond is comprised.

9. The powdery plant activator of claim 8, wherein the hydrocarbon group $R^3$ of the hydroxy fatty acid has 6 to 8 carbon atoms, and the hydrocarbon group $R^4$ of the hydroxy fatty acid has 4 to 6 carbon atoms.

10. The powdery plant activator of claim 9, wherein $R^3$ of the hydroxy fatty acid is $—(CH_2)_n—$, wherein n is an integer from 4 to 12, and $R^4$ of the hydroxy fatty acid derivative is $C_nH_{2n+1}—$, wherein n is an integer from 2 to 8.

11. The powdery plant activator of claim 10, wherein $R^3$ of the hydroxy fatty acid is an alkylene group ($—(CH_2)_7—$) having 7 carbon atoms, and $R^4$ of the hydroxy fatty acid derivative is an alkyl group ($CH_3CH_2CH_2CH_2CH_2—$) having 5 carbon atoms.

12. The powdery plant activator of claim 1, wherein the at least one compound is a hydroxy fatty acid, which is hydroxyoctadecenoic acid.

13. The powdery plant activator of claim 12, wherein the hydroxy fatty acid is 9,10,13-trihydroxy-11-octadecenoic acid.

14. The powdery plant activator of claim 12, wherein the hydroxy fatty acid derivative is 9,12,13-trihydroxy-10-octadecenoic acid.

15. The powdery plant activator of claim 1, wherein the powdery plant activator comprises the unsaturated fatty acid such that a ratio of the at least one compound selected from an oxo fatty acid or a derivative or a salt thereof and a hydroxy fatty acid or a derivative or a salt thereof relative to the unsaturated fatty acid is 10% to 90% by weight.

16. A plant treatment method, comprising:
applying the powdery plant activator of claim 1 as a spraying agent or an immersion agent for contacting with plant stems, leaves, or roots, or a soil injection agent.

17. The method of claim 16, wherein the powdery plant activator is applied to at least one plant selected from the group consisting of plants in family Brassicaceae, Poaceae, Fabaceae, Solanaceae, Rosaceae, Amaranthaceae, or Malvaceae.

18. A method for manufacturing a powdery plant activator comprising:
at least one compound selected from the group consisting of an oxo fatty acid or a derivative or a salt thereof and a hydroxy fatty acid or a derivative or a salt thereof; and
an unsaturated fatty acid, wherein the unsaturated fatty acid is linoleic acid,
the method comprising:
a freeze-drying to obtain a powdered form.

19. The method for manufacturing the powdery plant activator of claim 18, further comprising:
dispersing the at least one compound selected from the group consisting of an oxo fatty acid or a derivative or a salt thereof and a hydroxy fatty acid or a derivative or a salt thereof, and the unsaturated fatty acid in water in order to obtain a water dispersion; and
subjecting the water dispersion to the freeze-drying step by freezing the water dispersion and reducing a pressure to obtain the powdered form.

20. The method for manufacturing the powdery plant activator of claim 19, wherein the water dispersion comprises a stabilizing agent.

21. The method for manufacturing the powdery plant activator of claim 20, wherein the stabilizing agent is an emulsifier.

22. The method for manufacturing the powdery plant activator of claim 21, wherein the emulsifier is at least one or more compounds selected from potassium carbonate or dipotassium hydrogen phosphate.

23. The powdery plant activator of claim 1, wherein powders agglomerate with each other to form a block shape.

* * * * *